(12) United States Patent
Cadwell et al.

(10) Patent No.: US 10,676,290 B2
(45) Date of Patent: Jun. 9, 2020

(54) ROTATIONAL SORTER FOR SPHERICAL ITEMS

(71) Applicant: WOODSIDE ELECTRONICS CORPORATION, Woodland, CA (US)

(72) Inventors: Donald Paul Cadwell, Oak Run, CA (US); William Ray Wages, Grass Valley, CA (US)

(73) Assignee: Woodside Electronics Corporation, Woodland, CA (US)

( * ) Notice: Subject to any disclaimer, the term of this patent is extended or adjusted under 35 U.S.C. 154(b) by 25 days.

(21) Appl. No.: 16/126,890

(22) Filed: Sep. 10, 2018

(65) Prior Publication Data

US 2019/0077611 A1    Mar. 14, 2019

Related U.S. Application Data

(60) Provisional application No. 62/558,325, filed on Sep. 13, 2017.

(51) Int. Cl.
| | |
|---|---|
| *B65G 47/96* | (2006.01) |
| *B65G 47/84* | (2006.01) |
| *B07C 5/342* | (2006.01) |
| *B07C 5/36* | (2006.01) |

(52) U.S. Cl.
CPC ............ *B65G 47/965* (2013.01); *B07C 5/342* (2013.01); *B07C 5/36* (2013.01); *B07C 5/362* (2013.01); *B07C 5/363* (2013.01); *B07C 5/368* (2013.01); *B07C 2501/009* (2013.01); *B65G 47/846* (2013.01); *B65G 2201/0211* (2013.01)

(58) Field of Classification Search
CPC ........ B65G 47/34; B65G 47/38; B65G 47/40; B65G 47/846; B65G 47/965; B65G 2201/0211; B07C 5/36; B07C 5/362; B07C 5/363; B07C 5/342
USPC ........ 198/370.01, 370.04; 209/538, 539, 545
See application file for complete search history.

(56) References Cited

U.S. PATENT DOCUMENTS

| | | | | | |
|---|---|---|---|---|---|
| 3,750,879 | A | * | 8/1973 | Luckett .................. | B65G 1/045 198/349.8 |
| 4,143,751 | A | * | 3/1979 | Foster .................. | B65G 47/962 198/370.04 |
| 4,726,898 | A | * | 2/1988 | Mills ........................ | B07C 5/02 209/545 |

(Continued)

*Primary Examiner* — Terrell H Matthews
(74) *Attorney, Agent, or Firm* — R. Michael West

(57) ABSTRACT

A sorter for agricultural items comprising a main frame with a circular horizontal plate having an outer edge cam surface. A circular sub-frame is mounted for rotation about the plate's vertical axis, in parallel relation to the plate. The sub-frame includes plural item cups pivotally mounted on its periphery. The cam surface tilts the cups from a raised loading position, to a horizontal viewing position, to a lowered ejection position. A loading zone includes means for loading an individual item into a respective cup. A viewing zone has camera means for optically viewing individual items as each rolls through the cup, producing an output signal corresponding to reflectivity characteristics. Computer means compares the output signal to predetermined values and produces a corresponding ejection signal. A re-direction zone includes plural ejectors, whereby a selected one of the ejectors ejects the item out its cup in response to an ejection signal.

11 Claims, 12 Drawing Sheets

(56) References Cited

U.S. PATENT DOCUMENTS

| | | | | |
|---|---|---|---|---|
| 4,924,998 A | * | 5/1990 | Fuller, Jr. | B65G 21/18 198/370.04 |
| 5,267,654 A | * | 12/1993 | Leverett | B07C 5/3422 177/145 |
| 5,626,236 A | * | 5/1997 | Hiebert | B07C 5/36 198/370.02 |
| 5,878,863 A | * | 3/1999 | Madden | B65G 47/965 198/370.04 |
| 6,082,522 A | * | 7/2000 | Polling | B65G 47/962 198/370.04 |
| 2006/0054471 A1 | * | 3/2006 | Maeda | B65G 17/086 198/851 |
| 2008/0095666 A1 | * | 4/2008 | Burkhardt | G01N 35/025 422/64 |
| 2009/0129910 A1 | * | 5/2009 | Grundtvig | B65G 47/682 414/751.1 |

\* cited by examiner

ROTATIONAL SORTER FOR SPHERICAL ITEMS

PRIORITY CLAIM

Pursuant to the provisions of 35 U.S.C. Section 119(e), Applicants claim the priority of their U.S. Provisional Patent Application No. 62/558,325, filed Sep. 13, 2017.

BACKGROUND OF THE INVENTION

1. Field of the Invention

The invention relates generally to automated sorting devices for comestibles, such as nuts and small fruits. More specifically, the invention pertains to sorting devices which employ electro-mechanical means to sample the reflective characteristics of items such as agricultural produce, by rolling individual items through the field of view of a camera system, and making item sorting determinations and undertaking item segregation, based upon the detected reflective characteristics of the item.

2. Description of the Prior Art

U.S. Pat. No. 4,143,751, issued to Foster et al., discloses Circular Sortation Apparatus And Methods. This arrangement uses a rotatable, circular ring on which tiltable tray carriages are mounted. Rollers are used to support the ring, and a peripheral drive mechanism is used to impart rotating motion to the ring. One claimed advantage of the device is its ability to sort articles both on the outside and on the inside of the ring.

In U.S. Pat. No. 5,267,654, granted to Leverett, an Article-Holding Cup And Sorting Apparatus is shown. The article holding "cup" is defined by a pair of rotatable rollers. The rollers rotate in response to the motion of a wheel, rolling on a plate in a property-determining zone to expose different areas of the article to optical scanners. A plurality of fabric flaps is disposed on rods connected between two conveyors for gently receiving articles selectively discharged in a discharge zone.

A Conveying System For Foodstuffs is shown in U.S. Pat. No. 5,878,863, issued to Madden et al. A first conveyor 11 and a second conveyor 12 are arranged in side-by-side "overlapping" relation. A tilting device is provided to tilt the foodstuff support on the first conveyor to cause the foodstuff to roll to a support cup on the second conveyor. The first conveyor includes a photographic zone, and the second conveyor includes a weighing zone and multiple ejection zones.

A Method And Apparatus For Handling Objects is disclosed in U.S. Pat. No. 5,626,236, issued to Hiebert. As shown in FIG. 1, this apparatus has a singulation zone, a multiple camera sampling zone, a data processing computer, and a multiple ejection/sorting zone. In FIG. 4, the fruit is rotated as it passes by the cameras. FIGS. 9 and 10 illustrate the ejection apparatus designed to roll the fruit out of the roller/cup.

In U.S. Pat. No. 4,726,898, granted to Mills et al., an Apparatus For Spinning Fruit For Sorting Thereof is disclosed. FIG. 4 shows the arrangement for spinning the fruit both before and during the optical scanning process. This device appears adapted especially to sort lemons, or fruit having similar physical characteristics, as the slightly elongated articles are spun around their stem axes. (See, FIGS. 1 and 4).

However, the need still exists for an improved sorter for generally spherical items, including comestibles such as nuts and small fruits, which treats them very gently during the sampling and sorting processes, so they will not be damaged or bruised;

The need also exists for an improved sorter which uses a mechanically simple rotational sorting assembly with easily replaceable parts;

The need further exists for an improved sorter with elongated tipping cups for laterally confining an individual item or product to be sorted, while it is rolled from one end of the cup to the other during the optical sampling process;

The need also exists for a rotational sorter employing a viewing station with multiple cameras viewing and collecting light-wave energy reflected from all sides of an item, so that a computer can make condition and suitability determinations; and, The need further exists for an improved sorter employing pneumatic ejection means, to effect touchless removal of the sorted items from its respective tipping cup and deposit onto a selection conveyor.

These and other objects and features of the invention herein will become apparent from the drawings and the written specification which follow.

SUMMARY OF THE INVENTION

The invention comprises a rotational sorter for spherical items, particularly agricultural comestibles such as nuts and small fruits. The sorter comprises a main frame with a circular and generally planar horizontal plate mounted thereto. The plate has an outer edge portion provided with a cam surface extending therearound. The cam surface may also be provided in a separate cam plate, affixed around the outer periphery of the plate. The cam surface has a variable radial distance as measured from a vertical axis passing through the center of the horizontal plate.

The rotational sorter also comprises a sub-frame which is circular and generally planar in configuration. The sub-frame is mounted for rotation on the main frame, in parallel relation to the plate and about its vertical axis. The sub-frame includes an outer periphery provided with a plurality of cup mount receivers.

A plurality of item cups is also provided. Each of the item cups has an elongated axis extending from an inner end to an outer end. Each cup also has a pair of slightly diverging sidewalls, extending from its inner end to its outer end. The inner end of each cup is pivotally mounted about a transverse horizontal axis to a respective cup receiver, on the sub-frame. During the sorting process, the item cups are tilted about their horizontal axes from a raised item loading position, to a generally horizontal item viewing position, to a lowered item ejection position. This change in cup orientation results from frictional engagement between the cam surface on the plate, and the inner end of each item cups as it is moved by the sub-frame in rotational orbit about the plate axis. Engagement between the cam surface and the inner ends of the item cups is maintained by rotational bias means applied to each cup.

The sorter further comprises an item loading zone located adjacent the periphery of the sub-frame. The loading zone includes singulator means for loading an individual item into a respective item cup, when the cup is in a raised item loading position.

The sorter also includes a viewing zone, located adjacent the periphery of the sub-frame and rotationally advanced, or downstream, from the loading zone. The viewing zone has a camera system including at least one camera for optically viewing an individual item as it rolls from the inner end to the outer end of a respective said cup item as it passes through the viewing zone. The camera system preferably includes multiple frequency illuminators directed toward the item cups, so that the camera produces output signals corresponding to each viewed item's reflectivity characteristics at different frequencies.

Computer means are provided to compare the output signals from the camera to predetermined values and to produce a corresponding ejection signal for each one of the viewed items. For example, for nut and fruit items, the predetermined values may correspond to ripe/unripe condition, bruised condition, size, and surface defects.

Lastly, the sorter includes a re-direction zone, where items are removed from the item cups are re-directed onto conveyors. The re-direction zone is located adjacent the periphery of the sub-frame and is rotationally advanced from the previously described viewing zone. The re-direction zone includes a plurality of pneumatic ejectors responsive to the computer means. By the time the item cups have reached this zone, they have been tilted downwardly by the cam surface to a lowered item ejection position. The computer means sends an actuation signal to a selected pneumatic ejector, which touchlessly urges an individual one of the items out of the outer end of its item cup onto a selective conveyor, in accordance with its previously viewed condition and appearance.

DETAILED DESCRIPTION OF THE PREFERRED EMBODIMENT

Figure 1:
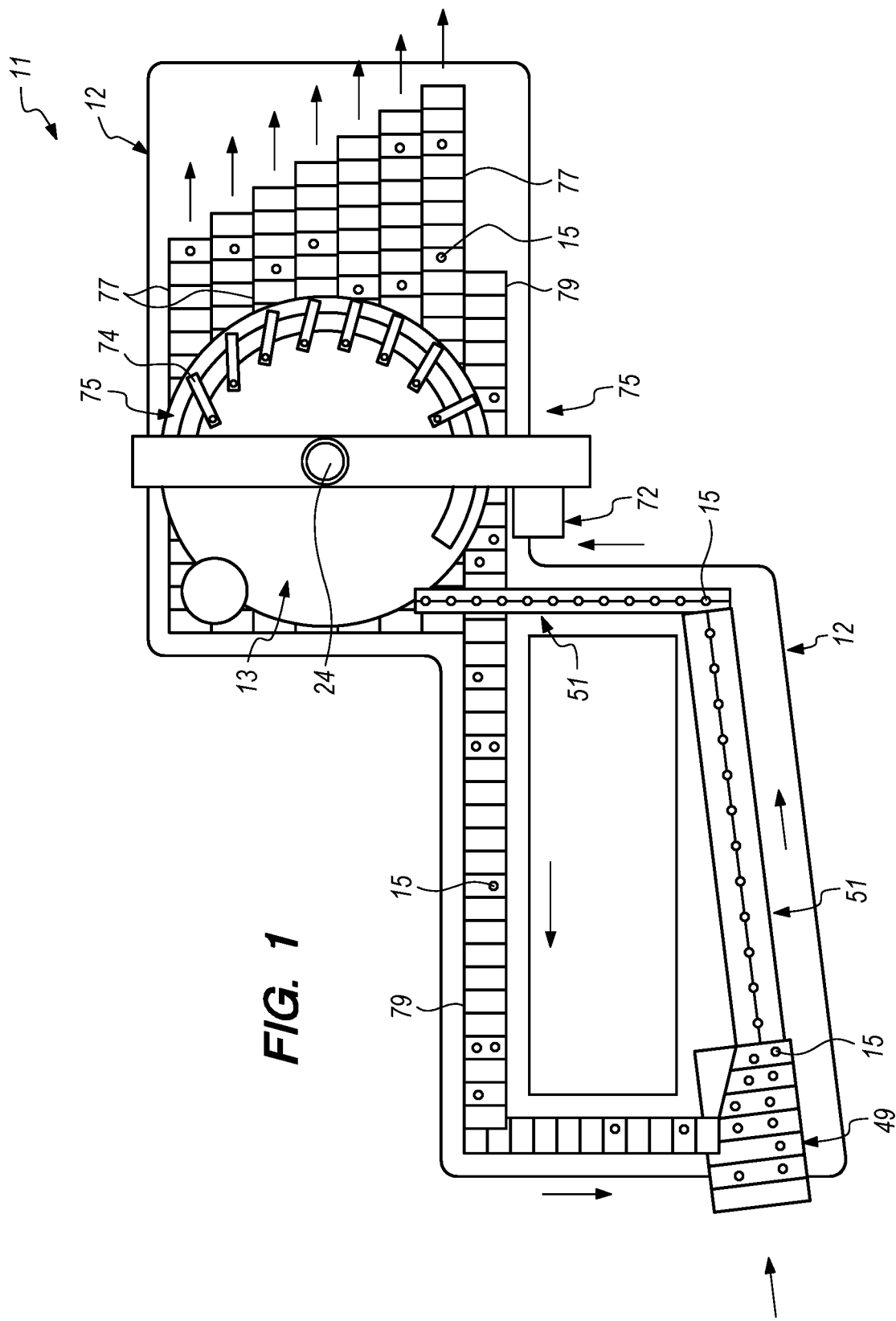
FIG. 1 is a top plan schematic view of a single station sorter, showing the infeed singulator conveyor, the rotating sorter assembly, the outfeed selective conveyors, and the return conveyor.

Turning now to the drawings, FIG. 1 shows a one line rotational sorter assembly 11, especially adapted for sorting generally spherical items 15, including agricultural comestibles, such as nuts and small fruits. Small fruits would include, for example, blueberries, blackberries, boysenberries, and the like. Rough handling by sorting machinery can easily damage such berries, undermining or destroying their value right at the end of the production cycle.

At the same time, the rotational sorter 11 is also usable for sorting a wide variety of other generally spherical items, some of them industrial, which are not particularly sensitive to damage from drops, roller/conveyors, or flat conveyor surface anomalies. For example, metal ball bearings could be examined and sorted by the present sorter assembly 11, with respect to size and surface imperfections. Plastic, vinyl, or leather balls could be similarly examined, perhaps adding color quality or color patterns as additional aspects of examination and sorting. In other words, sorter assembly 11 has usefulness not only in agricultural applications, but also in industrial and manufacturing applications.

Figure 3:
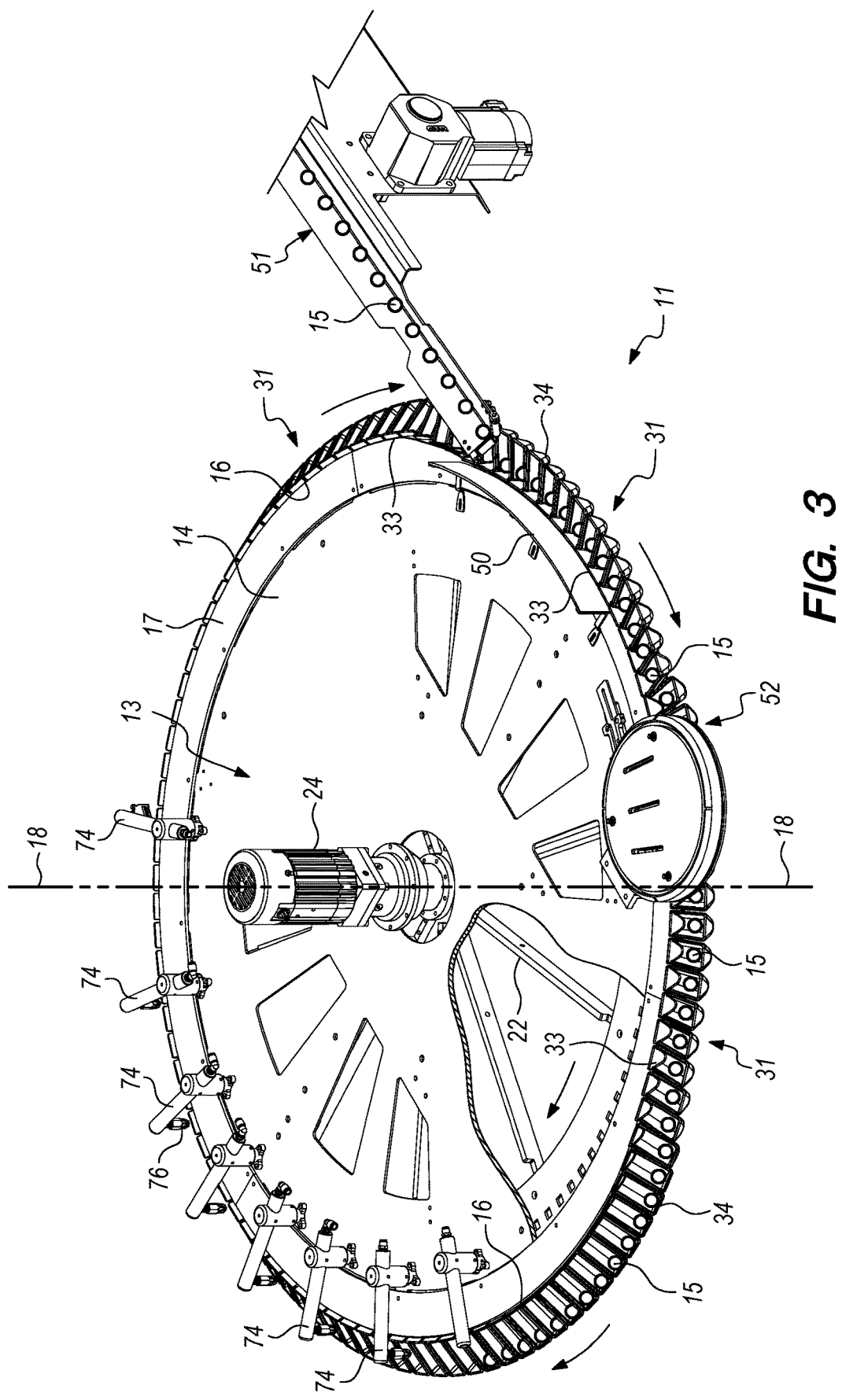
FIG. 3 is a perspective view of the rotating sorting assembly, a portion of the stationary upper plate and the peripheral cam plate being broken away to show the rotating lower spokes and ring.

Sorter assembly 11 is mounted upon a main frame 12, that may be expanded to include additional sorter lines, additional conveyors, and associated downstream apparatus for packing or further processing. As shown in FIGS. 1 and 3, a circular and generally planar horizontal plate 13, is mounted on main frame 12. Plate 13 has an outer edge portion 14 provided with a cam surface 16 extending therearound. Preferably, for ease of manufacture, a ring-like cam plate 17 including cam surface 16, is attached to outer edge portion 14, as shown in the drawings. However, cam surface 16 could directly be cut or milled into outer edge portion 14, eliminating the need for a separate plate structure.

Extending entirely around plate 13, cam surface 16 has variable radial distances from a vertical axis 18, passing through the center of horizontal plate 13. As will be explained in more detail below, the locations, contours, and extent of radial variations in the cam surface 16 effect important operations in conjunction with the sorter's other components, with simplicity, reliability and predictability.

Figure 4:
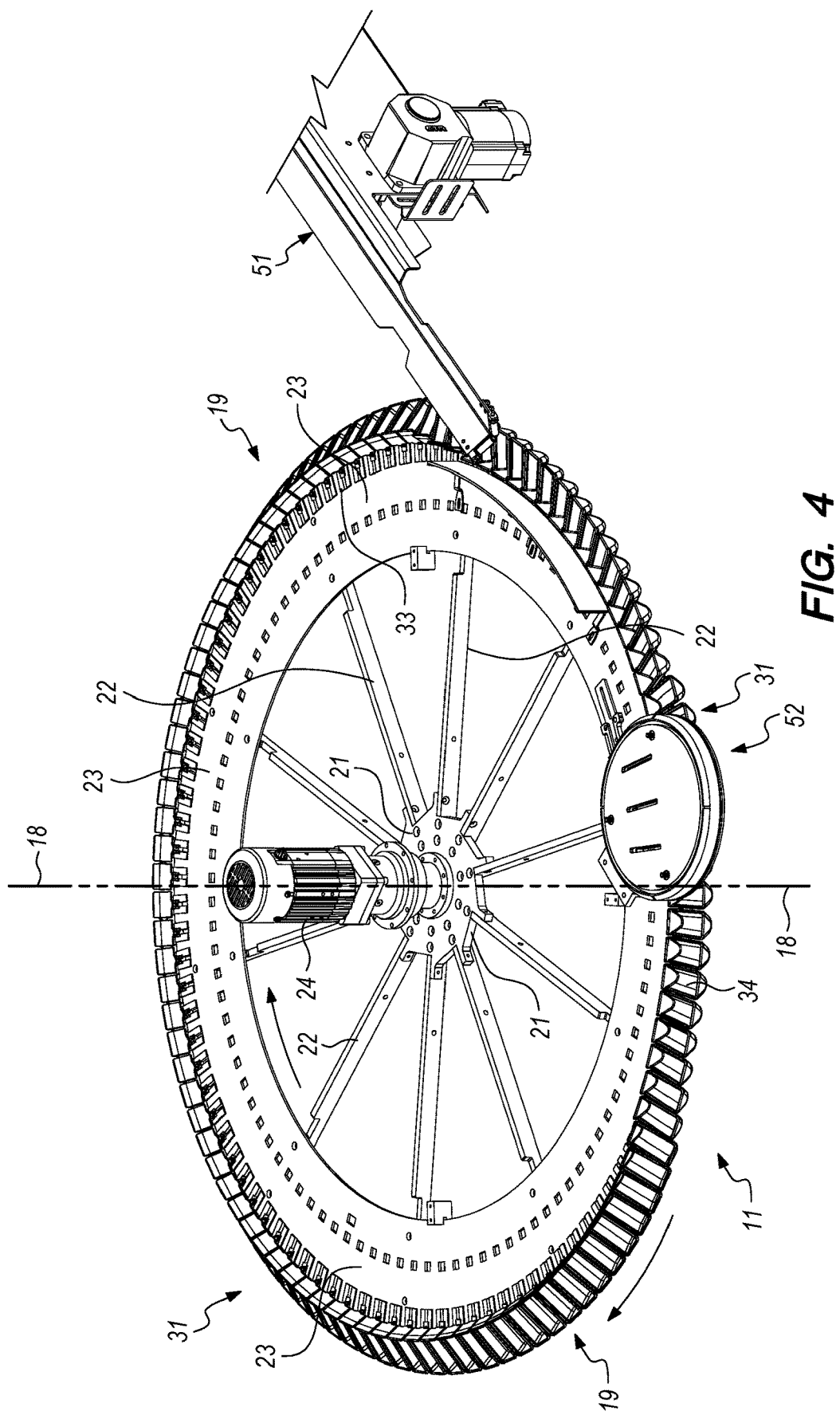
FIG. 4 is a perspective view of the rotating sub-frame, showing the plurality of item cups attached to its periphery, its drive motor attached to the hub and the radially extending spokes attached to the support ring.

Sorter assembly 11 also includes a sub-frame 19, most clearly shown in FIG. 4. As with plate 13, sub-frame 19 is circular and generally planar. However, sub-frame 19 is mounted for rotation on main frame 12 about vertical axis 18, below and in parallel relation to plate 13. It should be noted that with several modifications for relocation, sub-frame 19 could be mounted above plate 13. But primarily for reasons of safety and ease of manufacture, sub-frame 19 is below plate 13. Sub-frame 19 includes a central hub 21, a plurality of radially extending spokes 22, and a circular support ring 23. Spokes 22 extend under and are attached to support ring 23.

Sub-frame 19 is rotatably driven by at a predetermined speed by motor 24. Motor 24 has a rotatable shaft (not shown) attached to hub 21, while its body is attached to stationary plate 13. The predetermined speed of motor 24 is selected to allow reliable loading, viewing, and ejection operations of the sorter, without damage to the items 15 to be sorted.

Figure 6:
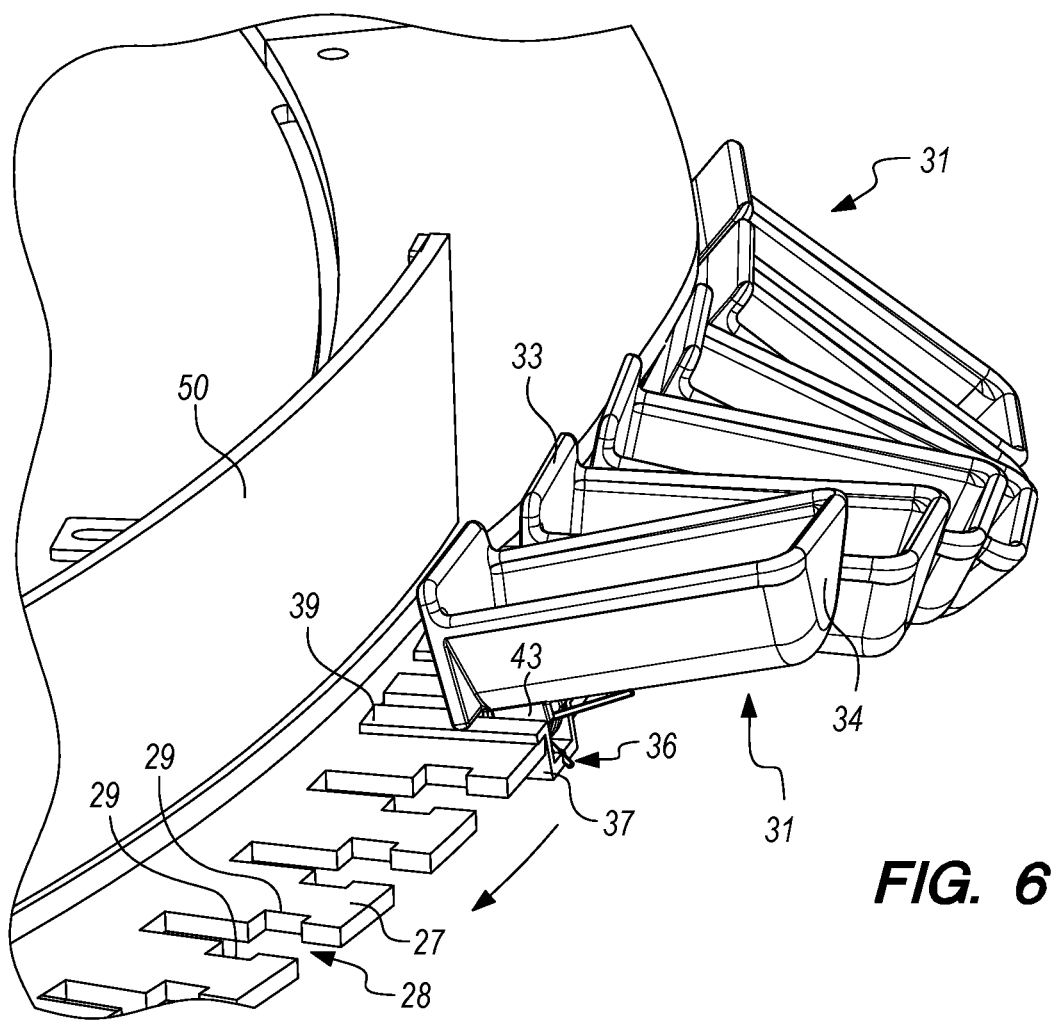
FIG. 6 is a fragmentary perspective view of the cam plate and a group of item cups being urged upwardly by spring bias to a raised item loading position, a number of the cups being removed for clarity to show the cup mount receivers.

The outer periphery of circular support ring 23 includes a plurality of cup mount receivers 26, arranged in spaced relation therearound. As seen in FIG. 6, each receiver 26 shares common structure with two adjacent receivers 26. For example, a receiver 26 is comprised of portions of two opposing tongue extensions 27 separated by an elongated channel 28. Channel 28 also includes a pair of opposing recesses 29, formed in the sides of respective extensions 27.

Figure 5:
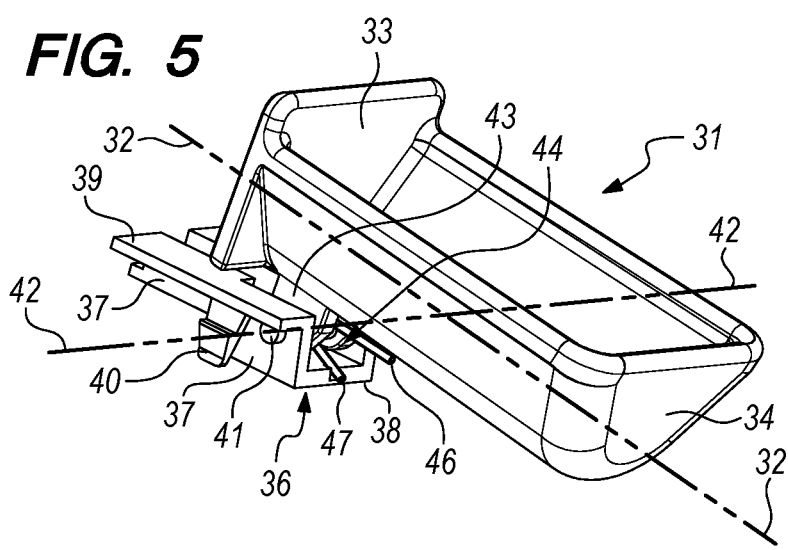
FIG. 5 is a right front perspective view of a single item cup, showing the cup mount, the horizontal pivot pin, a locking tab on one side, and the spring between the mount and the underside of the cup for effecting upward bias of the cup.

Sorter assembly 11 also includes a plurality of item cups 31, shown most clearly in FIG. 5. Each item cup 31 has an elongated axis 32 extending from an inner end 33 to an outer end 34. Item cup 31 also includes a mount 36, which is elongated and generally U-shaped in cross section. Mount 36 has opposing side walls 37, a floor 38, and flats 39 extending outwardly and perpendicularly from the upper edges of side walls 37. The outer sides of side walls 37 are provided with respective resiliently mounted locking tabs 40. Locking tabs 40 are sized and configured to engage respective recesses 29 in a cup mount receiver 26.

Mount 36 also has a pin 41, defining a horizontal transverse axis 42, extending between side walls 37 and passing through a bore in a flange 43 extending from the lower side of the inner end 33 of cup 31. Pin 41 passing through flange 43 effects a pivotal mount for cup 31 about a horizontal axis 42 transverse to the elongated axis 32 of cup 31. Cup 31 further includes a spring 44 having one arm 46 engaging the lower side of cup 31, and having another arm 47 engaging floor 38 of mount 36. Spring 44 provides upward rotational bias for the outer end 34 of cup 31 about pin 41.

In initial assembly of the rotational sorter assembly 11, item cups 31 are installed into a respective cup mount receiver 26 on the periphery of support ring 23. This is accomplished by sliding mount 36 within elongated channel 28 of the cup mount receiver 26. Because locking tabs 40 are resiliently mounted, they will bend inwardly slightly during the sliding process, and then snap securely into recesses 29. After the installation is complete, it should be noted that flats 39 rest over a respective underlying portion of a tongue extension 27 of receiver 26. For maintenance, such as removal and replacement of an item cup 31, the locking tabs 40 are squeezed inwardly, which allows the mount 36 of the item cup 31 to be pulled out of the channel 28, freeing up the receiver 26 for a new replacement item cup 31.

Figure 8:
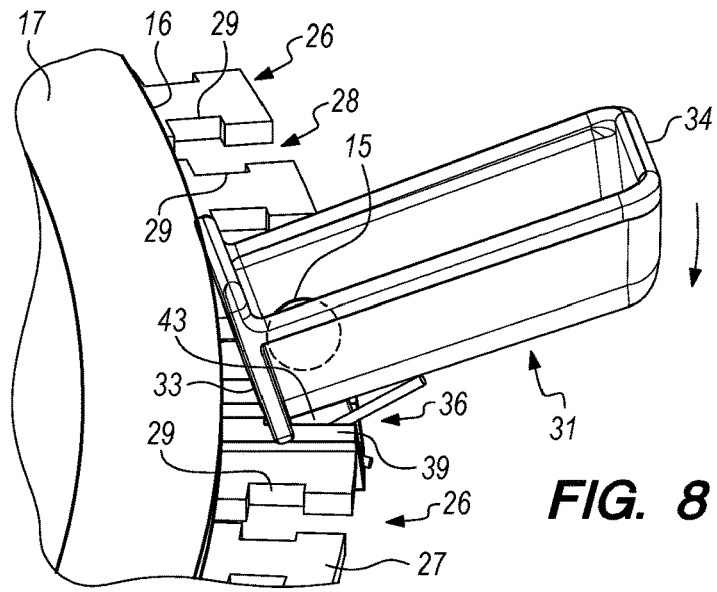
FIG. 8 is a fragmentary perspective view of a single item cup in a raised, item loading position, showing the outer edge of the cam plate at its minimum radial distance from the axis of rotation.
Figure 9:
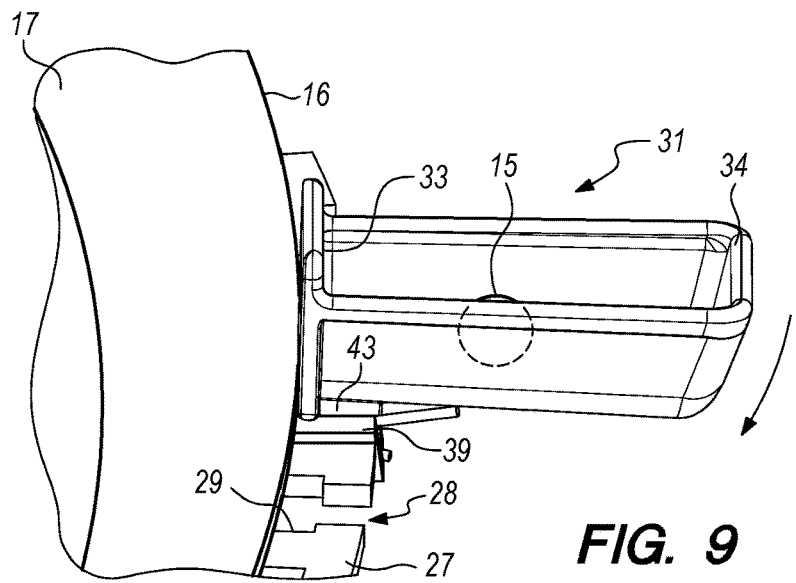
FIG. 9 is a fragmentary perspective view as in FIG. 8, but showing the item cup in a substantially level, item viewing position, the outer edge of the cam plate now at an intermediate radial distance from the axis of rotation.
Figure 10:
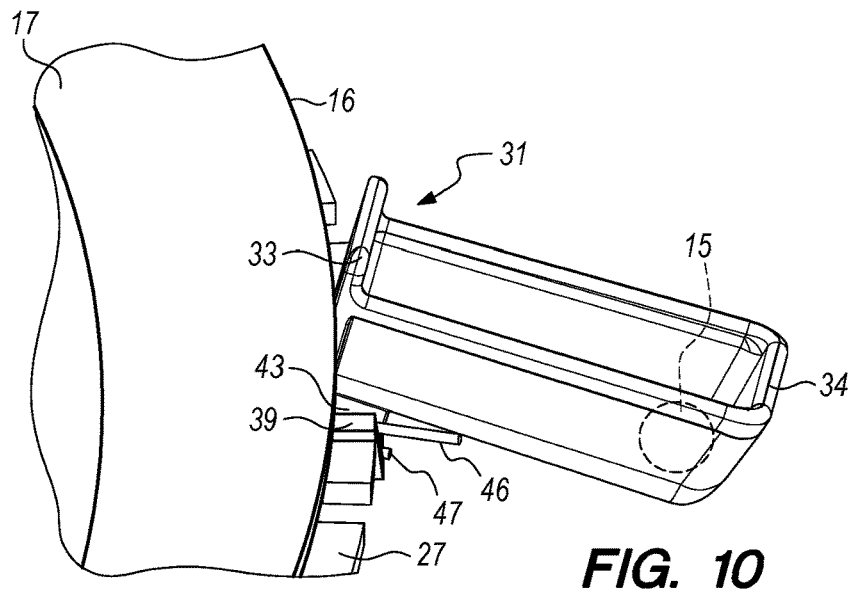
FIG. 10 is a fragmentary perspective view as in FIG. 8, but showing the item cup in a lowered, item ejection position, the outer edge of the cam plate now at its greatest radial distance from the axis of rotation.

When sub-frame 19 is rotationally driven, item cups 31 are placed into orbital motion around vertical axis 18. As item cups 31 progress around this orbital path, they undergo tipping movements about their horizontal axes 42 to facilitate retention, rolling, and ejection of the contained items. Making particular reference to FIGS. 8, 9, and 10, an item cup 31 is shown being tilted about its horizontal axis 42 from a raised item loading position (FIG. 8), to a generally horizontal item viewing position (FIG. 9), to a lowered item ejection position FIG. 10), owing to frictional engagement between cam surface 16 and the inner end 33 of each item cup 31 as it rotates in orbital fashion. It should also be noted that engagement between cam surface 16 and inner end 33 is constantly maintained by the rotational bias means provided by spring 44.

Figure 2:
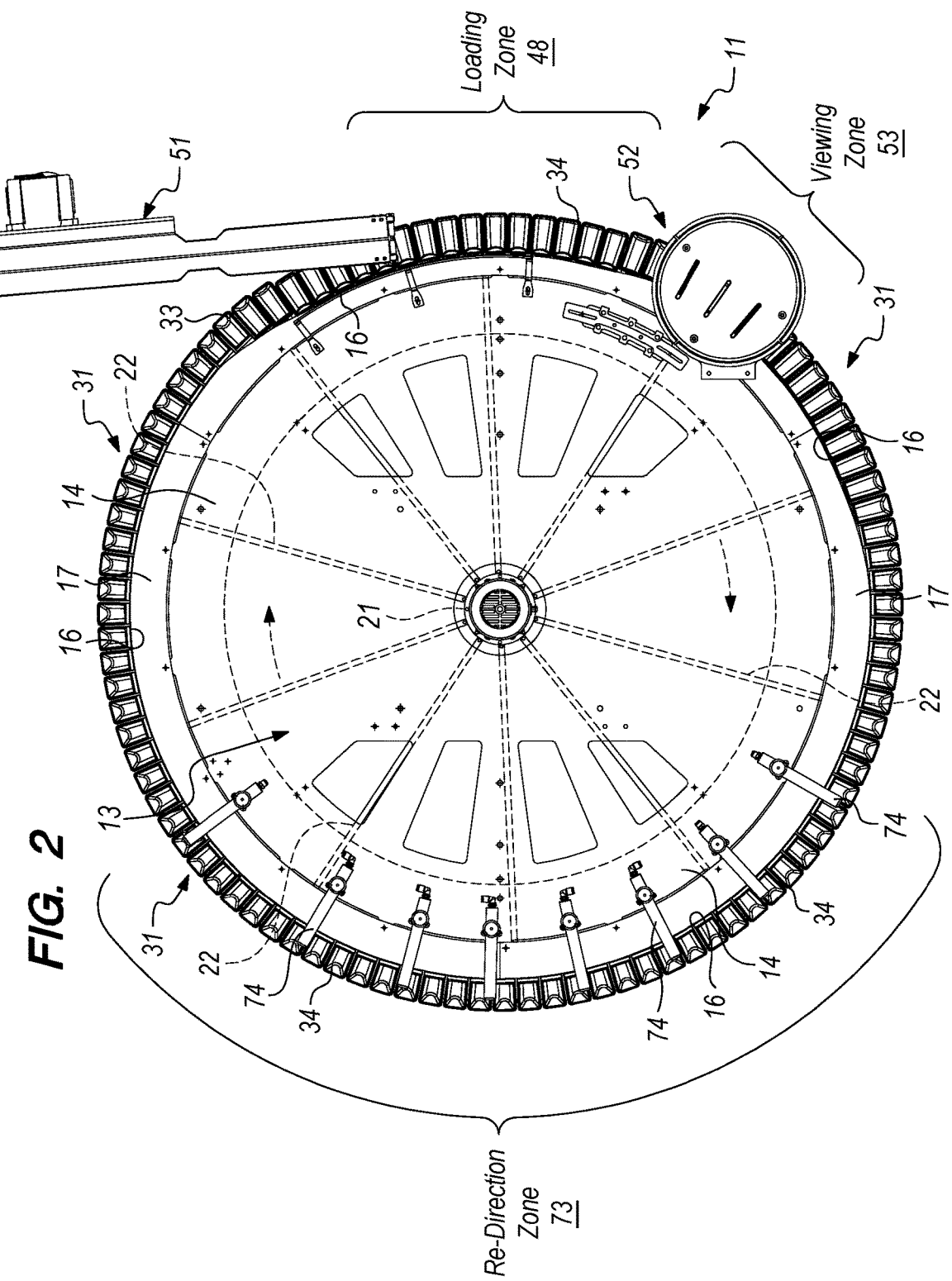
FIG. 2 is a top plan view of the rotating sorter assembly with a plurality of item cups mounted around its outer periphery, the lower spokes and the ring supporting the cups being shown in broken line.
Figure 7:
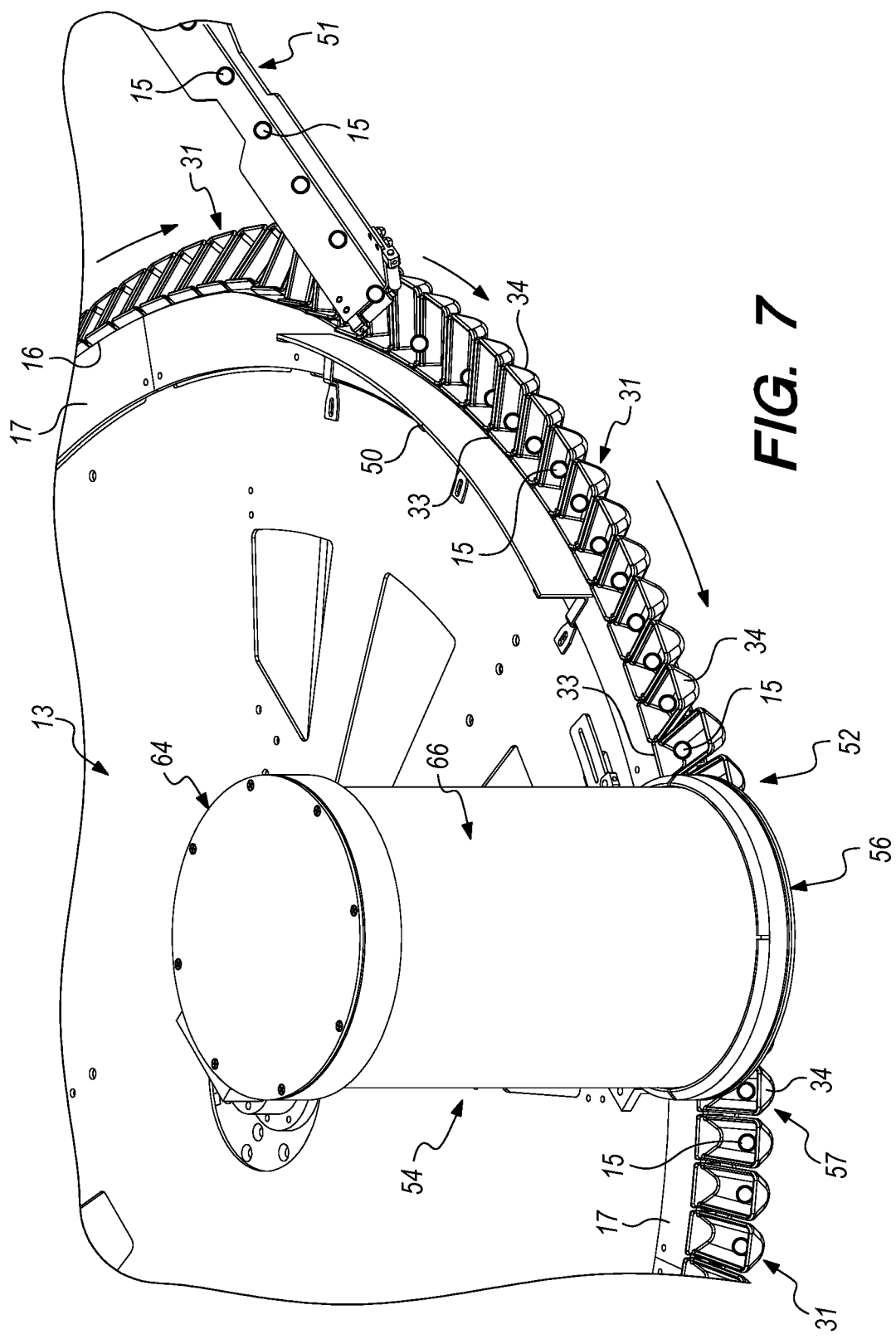
FIG. 7 is a fragmentary perspective view of the rotating sorter assembly, showing the orbital path of the item cups and the spherical items therein, from the loading zone through the viewing zone.

For the purpose of beginning the sorting process, a loading zone 48 (FIG. 2) is provided adjacent the periphery of sub-frame 19. The loading zone 48 is a region around the rotational sorter 11 where individual ones of items 15 are deposited into a respective item cup 31 and retained there, while resting or lodged against the cup's inner end 33. (See, FIGS. 3 and 8). As shown in FIG. 7, a curved shield 50 may be provided to ensure that an item 15 does not roll or bounce out of an item cup 31 during the loading process.

Upstream from the loading zone 48, an infeed conveyor 49 and singulator means 51 are provided. The infeed conveyor 49 typically transports a number of randomly arranged items 15 on its belt to the entry point of the singulator means 51, where the path narrows and the singulation process begins. The singulator means 51 processes the incoming items 15 by arranging them in lineal, serial fashion, after which individual ones of the items 15 can be deposited into a respective item cup 31. Singulators generally employ a combination of rollers arranged in a V-shaped trough, narrow conveyors, and vibrators or shakers to effect the physical re-arrangement of the item stream.

After an individual item 15 is deposited into an item cup 31, it is transported through an orbital path along with the cup 31, to an entry point 52 of viewing zone 53. (See, FIG. 2). During this period of transport, item 15 is retained within inner end 33 of cup 31 as the centripital forces provided by the raised and upended cup 31, are greater than the centrifugal forces resulting from the rotation of the sub-frame 19. However, as the cup 31 approaches the entry point 52, the radius of the cam surface 16 smoothly increases, and while pushing against the outer surface of inner end 33, causes item cup 31 to pivot into a generally horizontal position. (See, FIGS. 9 and 11). With the item cup 31 now in a generally horizontal position, the centrifugal forces resulting from the orbital rotation cause the item 15 to begin its roll toward the outer end 34 of the cup 31, as it enters the viewing zone 53.

Rotationally advanced or "downstream" from the loading zone 48, and located adjacent the periphery of sub-frame 19, the viewing zone 53 is the region around the rotational sorter 11 where items 15 are optically viewed by one or more cameras. These cameras produce electrical signals corresponding to the item's visual characteristics including item size, color, surface imperfections, and interior characteristics such as a bruised condition.

Figure 11:
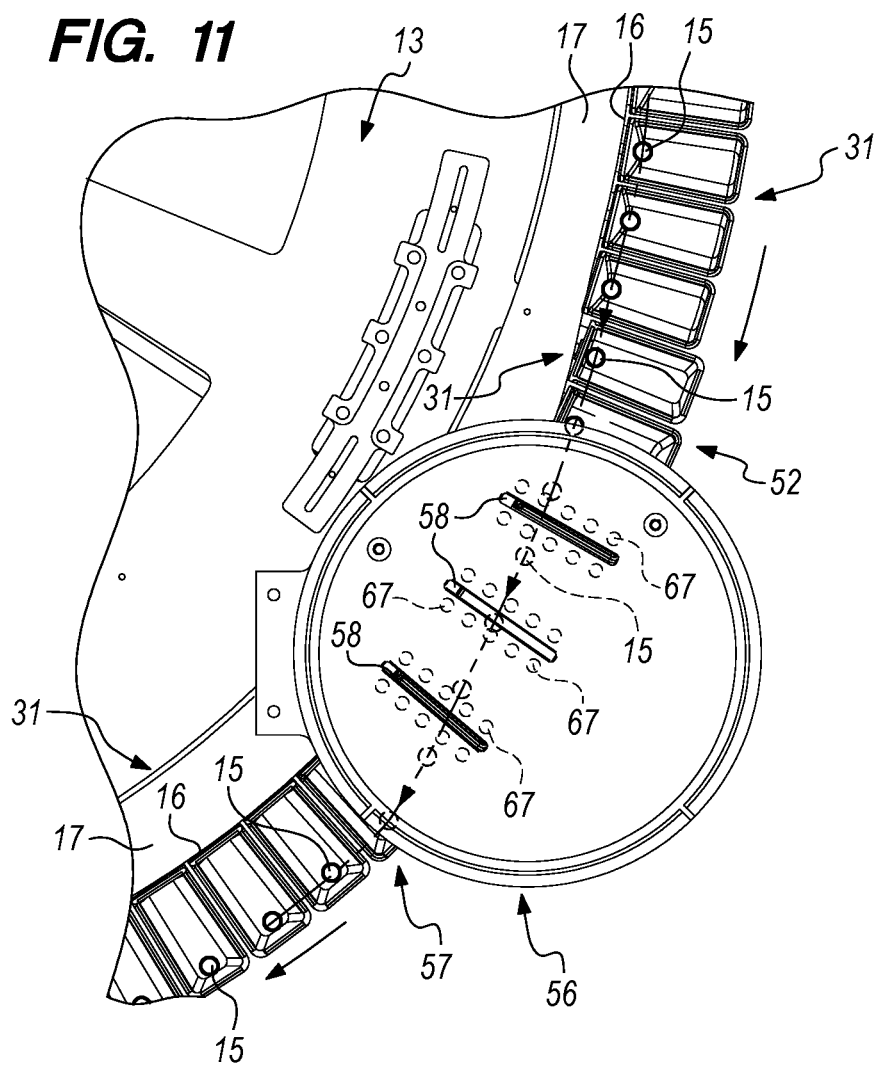
FIG. 11 is a fragmentary top plan view of the viewing zone, with the camera system housing removed for clarity, showing in broken line the progressive movement of items rolling from the inner end to the outer end of a respective item cup, while passing under the three camera viewing slits in the base plate.

To collect such information so that sorting decisions can be made, a camera system 54 is provided at viewing zone 53. Camera system 54 comprises a base plate 56, which is overlying item cups 31 as they progressively pass from entry point 52 to an exit point 57 of viewing zone 53. (See, FIG. 7). As shown in FIG. 11, base plate 56 is generally circular in plan, and includes three viewing slits 58, which pass therethrough. Viewing slits 58 are in spaced relation from each other, and are arranged in a slightly arcuate fashion so they are transverse to the orbital path of item cups 31. A circular plastic cover plate (not shown) may be installed over the upper side of base plate 56 to seal slits 58.

Figure 12:
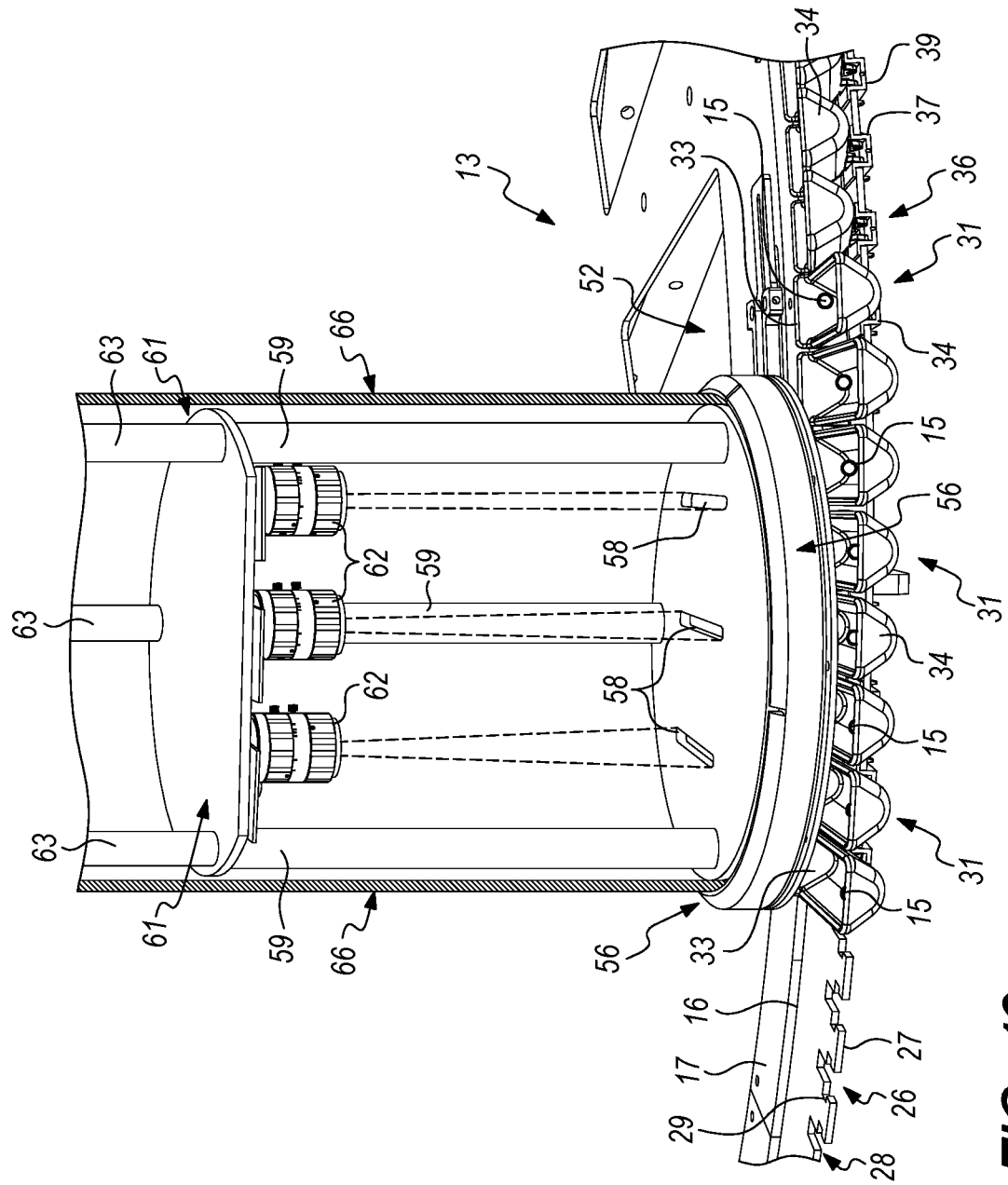
FIG. 12 is a fragmentary perspective view of the viewing zone, a portion of the housing for the camera system being broken away to show the support posts, the base plate, the camera plate, and the three cameras, depicting the rolling movement of the contained items caused by centrifugal force.

Three support posts 59 extend vertically from base plate 56, to maintain a camera plate 61 in spaced relation above base plate 56. Three line scan cameras 62 are mounted on the underside of camera plate 61, directed toward base plate 56. The sensor in each camera 62 comprises a single line of pixels that is sensitive to wavelengths from 400 nm to 1000 nm. Each camera 62 is focused on a respective slit 58, as represented by the broken lines shown in FIG. 12. The size of slits 58 and the field of view of each camera 62, ensure that each camera 62 views an item cup 31 from its inner end 33 to its outer end 34. Three extension posts 63, coaxial with respective support posts 59, continue upwardly from the upper side of camera plate 61 to support top plate 64. A cylindrical housing 66 extends from base plate 56 to top plate 64, and protects the cameras 62 and all other electronic items within camera system 54 from dirt, the elements, and stray light.

Figure 13:
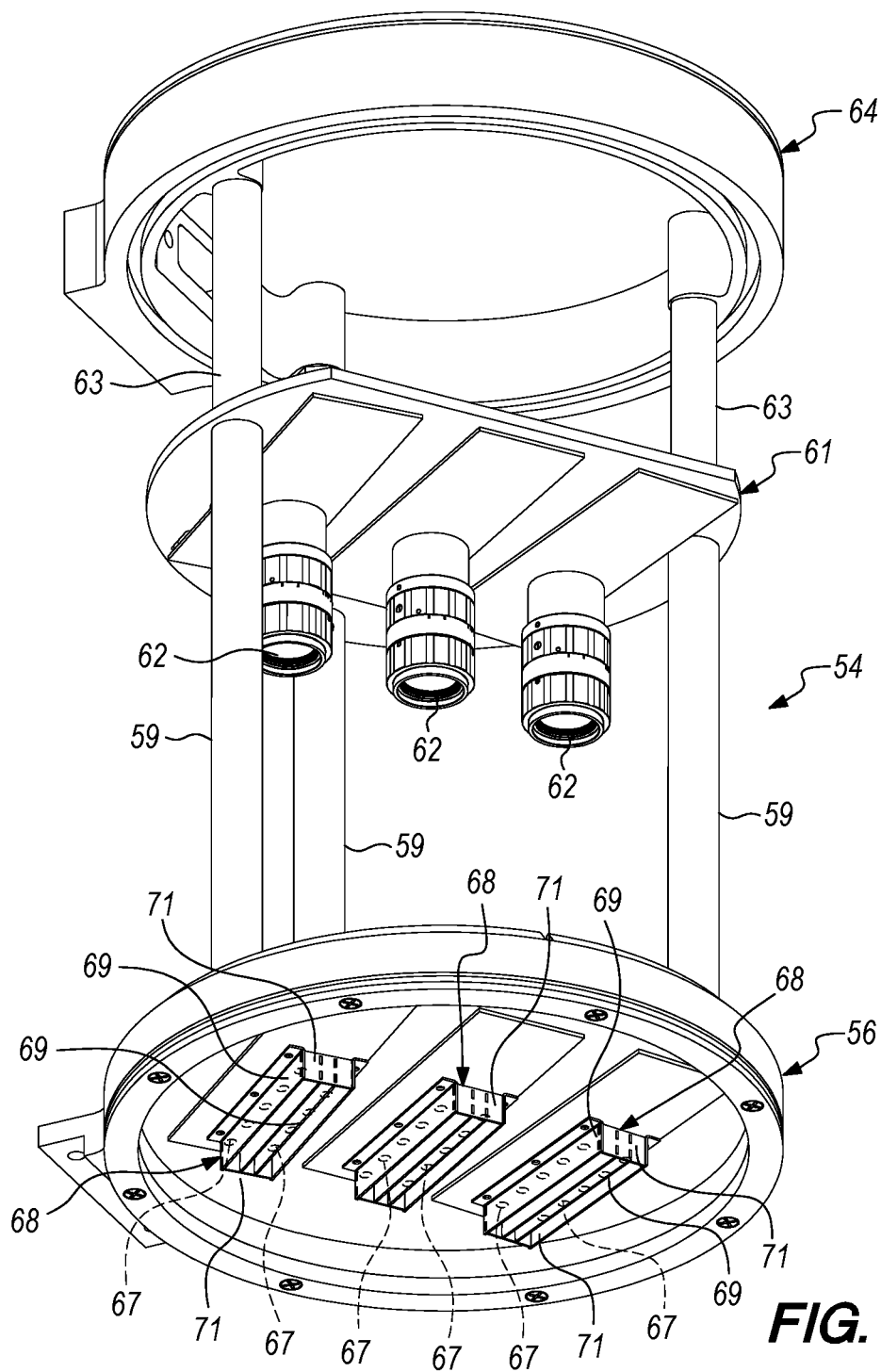
FIG. 13 is a low-angle perspective view of the camera system, with the housing removed for clarity, three illuminator and viewing baffle assemblies being shown on the underside of the base plate.

Camera system 54 also includes a plurality of illuminators 67 mounted on the underside of base plate 56, on either side of respective viewing slit 58. As shown in FIG. 13, each viewing slit 58 includes a baffle assembly 68 for housing illuminators 67, shown in broken line. The baffle assemblies 68 are designed to confine the light produced by illuminators 67, and direct that light downwardly, directly at items 15 below. For that purpose, each baffle assembly 68 includes side walls 69, and end walls 71, and an open downwardly facing side for each "chamber" housing illuminators 67. The baffle side walls 69 and end walls 71 are painted black, to reduce unwanted reflections. The two inner side walls 69 of each assembly 68 straddle a respective viewing slit 58, so each camera 62 will have an unimpeded view of items 15, but will not be "blinded" by light produced by the illuminators 67.

Preferably, illuminators 67 are Light Emitting Diodes (LEDS), having four different frequencies between approximately 400 nm to 1000 nm. The specific frequencies of the LEDS will depend upon the sorting application. For example, for blueberries, the LEDS are red, green, blue and 850 nm infrared. The illuminators 67 are driven in sequence to obtain electrical output signals from cameras 62, for each color. The intensity of the illumination is sufficient to pass through the skin of fruit to reflect back light from the internal flesh, revealing a bruised condition, if present. An ambient light sampling is also taken during each illumination sequence to improve the reliability and accuracy of sorting determinations.

The rotational sorter assembly 11 also includes computer means 72 responsive to the electrical output signals produced by cameras 62. Computer means 72 also produces the synchronized drive pulses for illuminators 67. Computer means 72 includes buffers to sample and store the output signals produced by the three cameras 62, during the passage of each item 15 as it passes through the viewing zone 53. In that manner, all sides of each item 15 are viewed, and reflectivity data is assembled and stored by computer means 72. Then, computer means 72 compares that data to predetermined values, to make determinations as to how each item 15 is to be treated. For example, each item 15 that has a certain size may be grouped with other such items 15. Or, each item 15 that is determined to be unripe, may be physically segregated from other items 15 that are determined to be ripe. In addition, after making such determinations, computer means 72 produces a corresponding ejection signal for each one of the viewed items 15.

Figure 14:
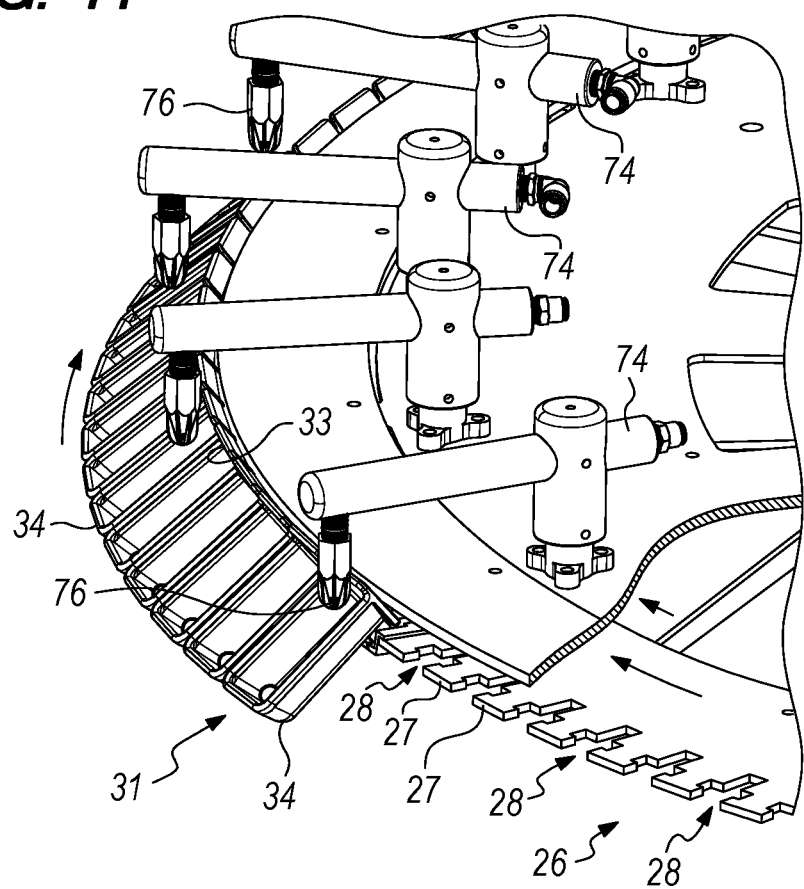
FIG. 14 is a fragmentary perspective view of the re-direction zone, showing the item cups in a lowered position and the plurality of pneumatic nozzle assemblies, a portion of the circular plate and the cam plate being broken away to show one of the rotating spokes attached to the cup support ring; and, FIG. 15 is a perspective view of the re-direction zone, showing a portion of the rotating sorter assembly, and a plurality of outfeed selection conveyors transporting items away which have pre-determined characteristics.

Lastly, rotational sorter assembly 11 includes a re-direction zone 73 which is located adjacent the periphery of sub-frame 19, and rotationally advanced from the viewing zone 53. The re-direction zone 73 includes a plurality of pneumatic ejectors 74 which are responsive to computer means 72. In other words, electrical ejection signals from computer means 72 actuate solenoid valves which direct pressurized air to a selected ejector 74. Each ejector 74 includes a nozzle 76, to direct a concentrated flow of pressurized air into a item cup 31 at the precise moment computer means 72 has determined that the item 15 therein should be ejected. Because the item 15 is already resting against the outer end of item cup 31, the touchless force provided by the jet of air easily removes the item 15 from cup 31. See, FIGS. 3, 10, and 14.

Figure 15:
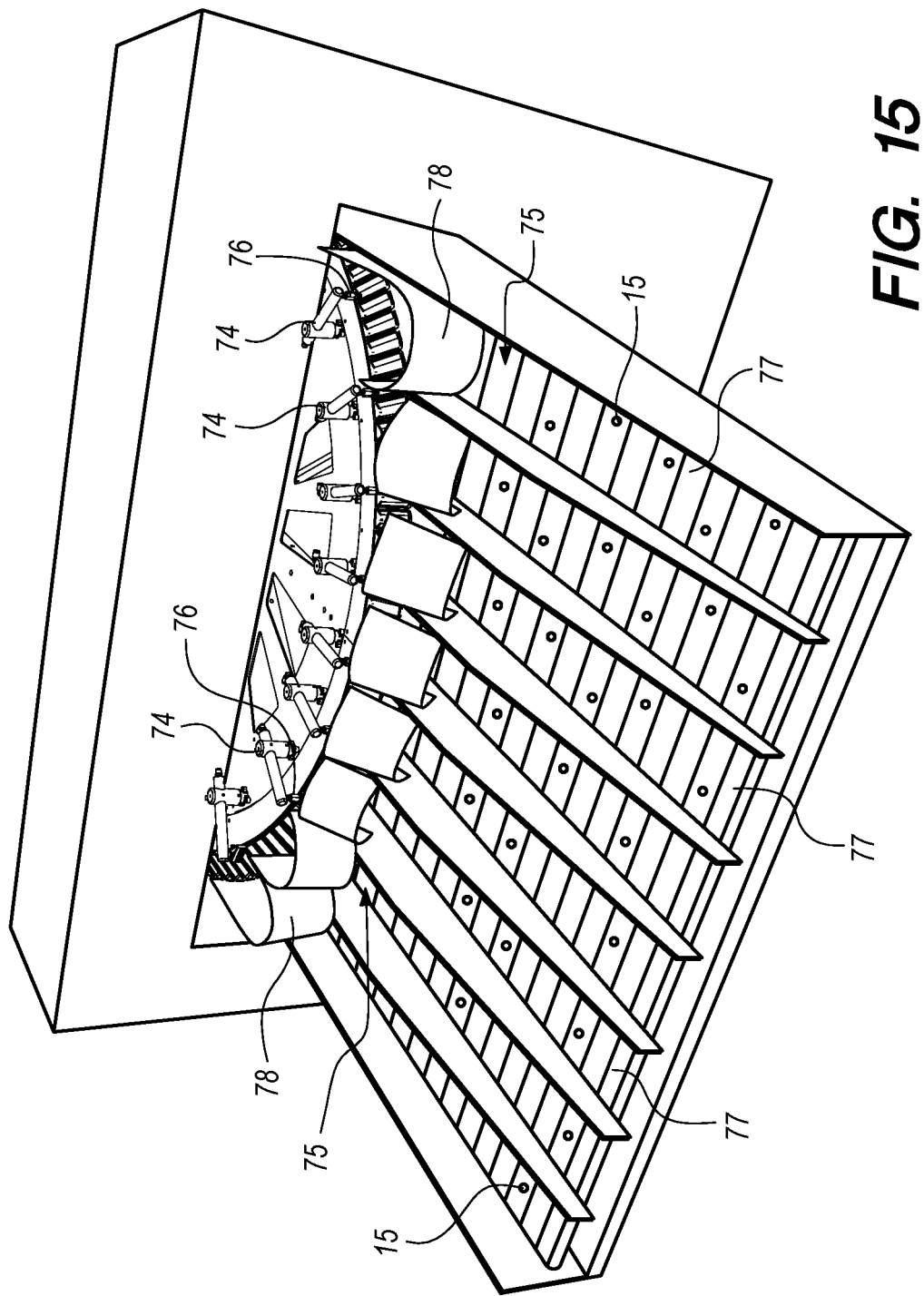

Making reference to FIG. 15, after an item 15 has been ejected from a cup 31, it drops downwardly onto a loading area 75 of a selection conveyor 77, corresponding to like items 15 which computer means 72 has determined should be grouped together. An arcuate shield 78 may be provided to restrain certain items 15 from traveling too far outwardly after ejection.

And, a return conveyor 79 having a loading area 75, may be provided at the end of the re-direction zone 73 to deal with "doubles". Occasionally, when items 15 are loaded into item cups 31, two items 15 may be loaded instead of one. The computer means 72 can determine this condition from data obtained in the viewing zone 53, and send an appropriate signal to the ejector 74 adjacent the return conveyor 79, so the two items 15 can be returned to the input area above the singulator means 51 for re-sorting.

What is claimed is:

1. A rotational sorter for spherical items, comprising:
   a. a main frame;
   b. a horizontal plate mounted on said main frame, said plate being circular and generally planar and having an outer edge portion provided with a cam surface extending therearound, said cam surface having a variable radial distance from a vertical axis passing through a center of said horizontal plate;
   c. a sub-frame, said sub-frame being circular and generally planar, and being mounted for rotation on said main frame about said vertical axis while in parallel relation to said plate, said sub-frame including an outer periphery provided with a plurality of cup mount receivers;
   d. a plurality of item cups, each of said item cups having an elongated axis extending from an inner end to an outer end, said inner end of each said cups being pivotally mounted about a transverse horizontal axis to a respective one of said cup receivers, said item cups being tilted about said horizontal axis from a raised item loading position, to a generally horizontal item viewing position, to a lowered item ejection position, owing to engagement between said cam surface and said inner end of each of said item cups, said engagement being maintained by rotational bias means;
   e. a loading zone located adjacent said periphery of said sub-frame, including means for loading an individual item into a respective item cup, when said cup is in said raised item loading position;

f. a viewing zone, said viewing zone being located adjacent said periphery of said sub-frame and rotationally advanced from said loading zone, said viewing zone having at least one camera for optically viewing an individual item as each rolls from said inner end to said outer end of a respective said cup in said viewing zone, said at least one camera producing an output signal corresponding to each viewed item's reflectivity characteristics;

g. computer means responsive to said output signal, said computer means comparing said output signal to predetermined values and producing a corresponding ejection signal for each one of the viewed items; and, h. a re-direction zone, said re-direction zone being located adjacent said periphery of said sub-frame and rotationally advanced from said viewing zone, said re-direction zone including a plurality of ejectors responsive to said computer means, whereby a selected one of said ejectors urges an individual one of the items out of said outer end of its item cup in response to an ejection signal.

2. The sorter of claim 1, in which said cam surface is on a cam plate attached to said horizontal plate.

3. The sorter of claim 1, in which said sub-frame further comprises a central hub having an axis concentric with said vertical axis, a plurality of spokes extending radially from said hub, a cup support ring attached to said plurality of spokes and having an outer periphery provided with said cup mount receivers, and rotational drive means coupled to said hub for rotating said sub-frame.

4. The sorter of claim 1, in which each of said item cups includes a mount, said mount being elongated and generally U-shaped in cross-section, having opposing side walls, a floor, and flats extending outwardly and perpendicularly from an upper edge of each side wall, said mount further including a pin extending between said side walls, and in which said cup includes a flange extending from a lower side of the inner end of said cup provided with a bore to accommodate said pin, said cup further including a spring having one arm engaging said lower side of said cup and having another arm engaging said floor of said mount, providing upward rotational bias for said cup about said pin.

5. The sorter of claim 4, in which said side walls have outer sides, said outer sides being provided with respective resiliently mounted locking tabs, and in which said locking tabs are sized and configured to engage respective recesses in said cup mount receivers.

6. The sorter of claim 1, in which said means for loading comprises a singulator having a trough with inclined opposing walls, said trough arranging items in lineal and serial fashion before they drop off a discharge end of said trough, into a respective cup.

7. The sorter of claim 1, in which said viewing zone includes a plurality of cameras, each of said cameras further having a respective item illuminator, said viewing zone further including a baffle plate mounted above said cups passing through said viewing zone, said baffle plate including a respective camera viewing slit for each of said cameras, said viewing slits being oriented transverse to a direction of rotation for said cups, and in which each of said cameras is focused on a respective slit and includes optical means to scan along a length of said respective slit, as each item passes beneath said slit.

8. The sorter of claim 7, in which said illuminators are successively and repeatedly driven to expose items to lightwave frequencies of corresponding to red, green, and blue colors and to an infrared frequency of approximately 850 nm.

9. The sorter of claim 1, in which said ejectors in said re-direction zone are pneumatic, and in which each of said ejectors includes a nozzle directed at an item in a cup.

10. The sorter of claim 9, in which each of said ejectors further includes a respective selection conveyor proximate thereto, each of said selection conveyors having a loading area beneath an outer end of a passing cup, so that items ejected out of the cup will drop onto said loading area.

11. The sorter of claim 1, in which a return conveyor is provided, said return conveyor having a loading area proximate an ejector and beneath an outer end of a passing cup, so that items determined by said computer means not to meet said predetermined values will be ejected out of the cup and will drop onto said loading area of said return conveyor.

* * * * *